United States Patent
Marshall et al.

(10) Patent No.: US 7,286,756 B1
(45) Date of Patent: Oct. 23, 2007

(54) DWDM SYSTEM WITH IP TELEPHONY PROVISIONING AT REMOTE LOCATIONS

(75) Inventors: Howard Marshall, McKinney, TX (US); Kenneth Webber, Allen, TX (US); Russell Roberson, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 377 days.

(21) Appl. No.: 09/858,777

(22) Filed: May 15, 2001

(51) Int. Cl.
*H04B 10/08* (2006.01)
*H04B 17/00* (2006.01)

(52) U.S. Cl. ...................................................... 398/31

(58) Field of Classification Search ................ 398/58, 398/68, 71, 210, 30, 31
See application file for complete search history.

(56) References Cited

U.S. PATENT DOCUMENTS

| | | | |
|---|---|---|---|
| 5,113,459 A | | 5/1992 | Grasso et al. |
| 5,583,920 A | * | 12/1996 | Wheeler, Jr. ............. 379/88.01 |
| 6,236,499 B1 | * | 5/2001 | Berg et al. ................ 359/341.2 |
| 6,260,062 B1 | * | 7/2001 | Davis et al. ................ 709/223 |
| 6,370,149 B1 | * | 4/2002 | Gorman et al. ............. 370/419 |
| 6,606,744 B1 | * | 8/2003 | Mikurak ...................... 717/174 |
| 6,639,716 B1 | * | 10/2003 | Tomofuji ............... 359/341.41 |
| 6,714,343 B2 | * | 3/2004 | Goobar et al. ............. 359/337 |
| 6,718,141 B1 | * | 4/2004 | deVette ......................... 398/82 |
| 6,775,267 B1 | * | 8/2004 | Kung et al. ................. 370/352 |
| 6,879,783 B1 | * | 4/2005 | Nakahira ..................... 398/51 |
| 6,965,562 B2 | * | 11/2005 | Tuomi ......................... 370/230 |
| 2001/0030785 A1 | * | 10/2001 | Pangrac et al. ............. 359/125 |
| 2002/0063924 A1 | * | 5/2002 | Kimbrough et al. ........ 359/125 |
| 2002/0101831 A1 | * | 8/2002 | Gutman et al. ............. 370/316 |
| 2002/0122219 A1 | * | 9/2002 | Funk ........................... 359/110 |
| 2003/0031302 A1 | * | 2/2003 | Resuta ..................... 379/27.02 |
| 2003/0086140 A1 | * | 5/2003 | Thomas et al. ............. 359/167 |

* cited by examiner

*Primary Examiner*—Shi K Li
(74) *Attorney, Agent, or Firm*—Cindy Kaplan

(57) ABSTRACT

A method for providing voice communications at an optical amplifier site of a DWDM system is disclosed. The method generally comprises receiving an optical service channel at the amplifier site and converting an optical signal of the optical service channel to a digital electrical signal at the amplifier site. The optical service channel carries voice data and has a wavelength that is out of band with respect to wavelength bands of a multiplexed payload channel of the DWDM system. The method further includes sending the digital electrical signal to a router configured to support voice over IP.

23 Claims, 4 Drawing Sheets

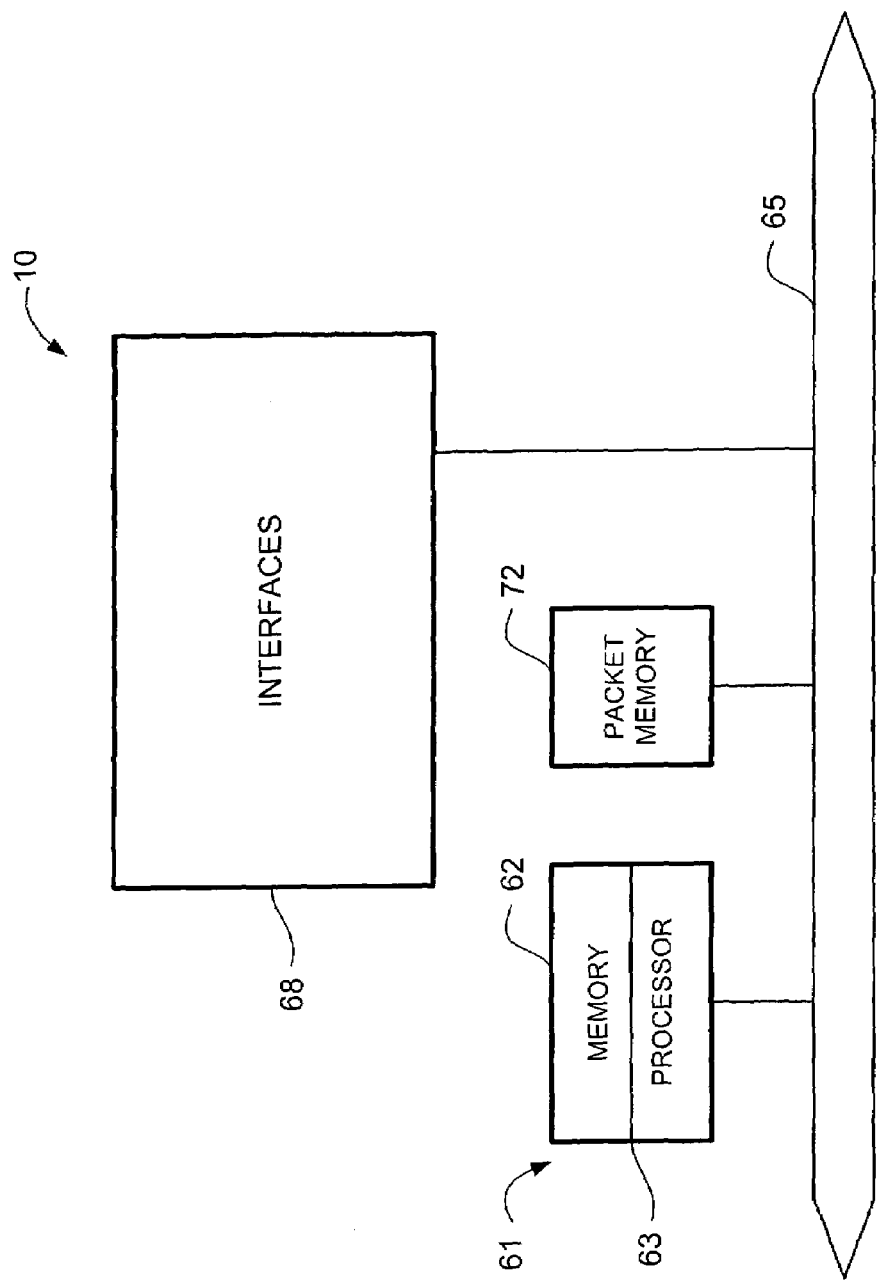

DWDM SYSTEM WITH IP TELEPHONY PROVISIONING AT REMOTE LOCATIONS

BACKGROUND OF THE INVENTION

The present invention relates generally to communication networks, and more specifically, to a dense wavelength division multiplexing (DWDM) system configured to support IP telephony at remote equipment site locations.

Historically service providers have used several layers of equipment to construct high-speed data networks (e.g., routers over ATM switches over Synchronous Optical Network/Synchronous Digital Hierarchy (SONET/SDH) network elements). Each piece of equipment performs a unique function. For example, ATM switches enable traffic engineering and SONET/SDH network elements provide performance monitoring and ring-based protection. A large amount of equipment is needed under this model, and the cost of delivering data services in this manner is very high. Constant upgrades are required for all of these network elements as the network grows, thus, the model does not scale well.

Furthermore, since optical signals become attenuated as they travel through fiber they must be periodically regenerated in core networks. In SONET/SDH optical networks each separate fiber carrying a single optical signal requires a separate electrical regenerator every 60 to 100 km. As additional fibers are added in a core network, the total cost of regenerators becomes very large. The regenerator receives a modulated optical signal, transforms it to an electronic signal, amplifies it, and then converts the electronic signal back to an optical signal of the same modulation and bit rate. Regenerators only amplify a single wavelength. Therefore, considering that in an optical link there are several regenerators, in a multiwavelength fiber system the maintenance cost is significant.

DWDM technologies allow IP service providers to achieve functionality without the expense of deploying SONET/SDH and ATM equipment or protocols. Wavelength Division Multiplexing (WDM) is an optical technology that couples many wavelengths in the same fiber, thus effectively increasing the aggregate bandwidth per fiber to the sum of the bit rates of each wavelength. Dense WDM (DWDM) is a technology with a larger (denser) number of wavelengths (e.g., >40) coupled into a fiber than WDM. Systems may support, for example, 100 wavelengths per fiber, enabling a single fiber to carry several hundred gigabits of information. DWDM increases the capacity of embedded fiber by first assigning incoming optical signals to specific frequencies within a designated frequency band and then multiplexing the resulting signals out onto one fiber. DWDM combines multiple optical signals so that they can be amplified as a group and transported over a single fiber to increase capacity. Each signal can be at a different rate and in a different format. DWDM applications include ultra-high bandwidth long haul as well as ultra-high-speed metropolitan or inner city-networks, and at the edge of other networks such as SONET, Internet protocol (IP) and asynchronous transfer mode (ATM).

Long-haul DWDM systems take standard optical signals from elements such as SONET/SDH network elements, IP routers, or ATM switches and convert each signal to a distinct, precise wavelength (e.g., in the 1530 to 1610 nm range). These individual wavelengths are then combined (optically multiplexed) onto a single fiber. In the receive direction of the system, the reverse process takes place. Individual wavelengths are filtered from the multiplexed fiber and converted back to a standard signal to the client. The complete DWDM system typically includes modules for each client interface in addition to equipment for multistage optical combining or splitting of wavelengths, amplification, and management/control.

DWDM systems reduce the need for and cost of electrical regeneration over long distances. As a result, virtually all operators of long distance fiber optic networks have implemented or expect to implement DWDM. The introduction of optical amplifiers in conjunction with DWDM systems has significantly reduced the cost of long-haul transmission. A single optical amplifier is able to reamplify all of the channels on a DWDM fiber without demultiplexing and processing them individually. The optical amplifier merely amplifies the signals, and does not reshape, retime, or retransmit them as a regenerator does. The signals may still need to be regenerated periodically, however, this can now be done approximately every 1000 kilometers. One optical amplifier can thus replace about 40 separate regenerators.

Since the channels are not demultiplexed at locations of optical amplifiers, a data channel is not typically available at remote geographic locations where the optical amplifier is located. If data access is required at these remote locations additional equipment is required to separate and pull off one or more channels. Furthermore, if voice communication is required, a public telephone line must be installed at each remote line site.

There is, therefore, a need for a system and method for providing data and voice access at optical amplifier location sites without the need for additional demultiplexing equipment or telephone lines.

SUMMARY OF THE INVENTION

A method for providing voice communications at an optical amplifier site of a DWDM system is disclosed. The method generally comprises receiving an optical service channel at the amplifier site and converting an optical signal of the optical service channel to a digital electrical signal at the amplifier site. The optical service channel carries voice data and has a wavelength that is out of band with respect to wavelength bands of a multiplexed payload channel of the DWDM system. The method further includes sending the digital electrical signal to a router configured to support voice over IP.

A system for providing voice communications at a line site of a DWDM system generally comprises a node at the line site operable to receive and send multiplexed optical signals of a payload channel and a separate optical service channel carrying voice data and having a wavelength that is out of band with respect to wavelength bands of the multiplexed payload channel. The system further includes a converter system operable to convert optical signals received from the optical service channel at the node to digital electrical signals and convert digital electrical signals to optical signals. The system also includes a router operable to receive the digital electrical signals and support voice over IP.

In another aspect of the invention a system for providing voice communications at an optical amplifier site of a DWDM system generally comprises means for receiving an optical service channel at the amplifier site. The optical service channel carries voice data and operates at a wavelength that is out of band with respect to wavelength bands of a multiplexed payload channel of the DWDM system. The system further includes a converter operable to convert an optical signal of the optical service channel to a digital electrical signal and means for sending the digital electrical signal to a router operable to support voice over IP.

A computer program product for providing voice communications at a line site location of a DWDM system generally comprises code that receives an optical service channel at the site location. The optical service channel carries voice data and has a wavelength band that is out of band with respect to the wavelength bands of a multiplexed payload channel of the DWDM system. The product further includes code that converts an optical signal of the optical service channel to a digital electrical signal and code that sends the digital electrical signal to a router configured to support voice over IP. The product also includes a computer readable storage medium for storing the codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 4 is a diagram of a router that may be used to route data received at the remote line sites.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
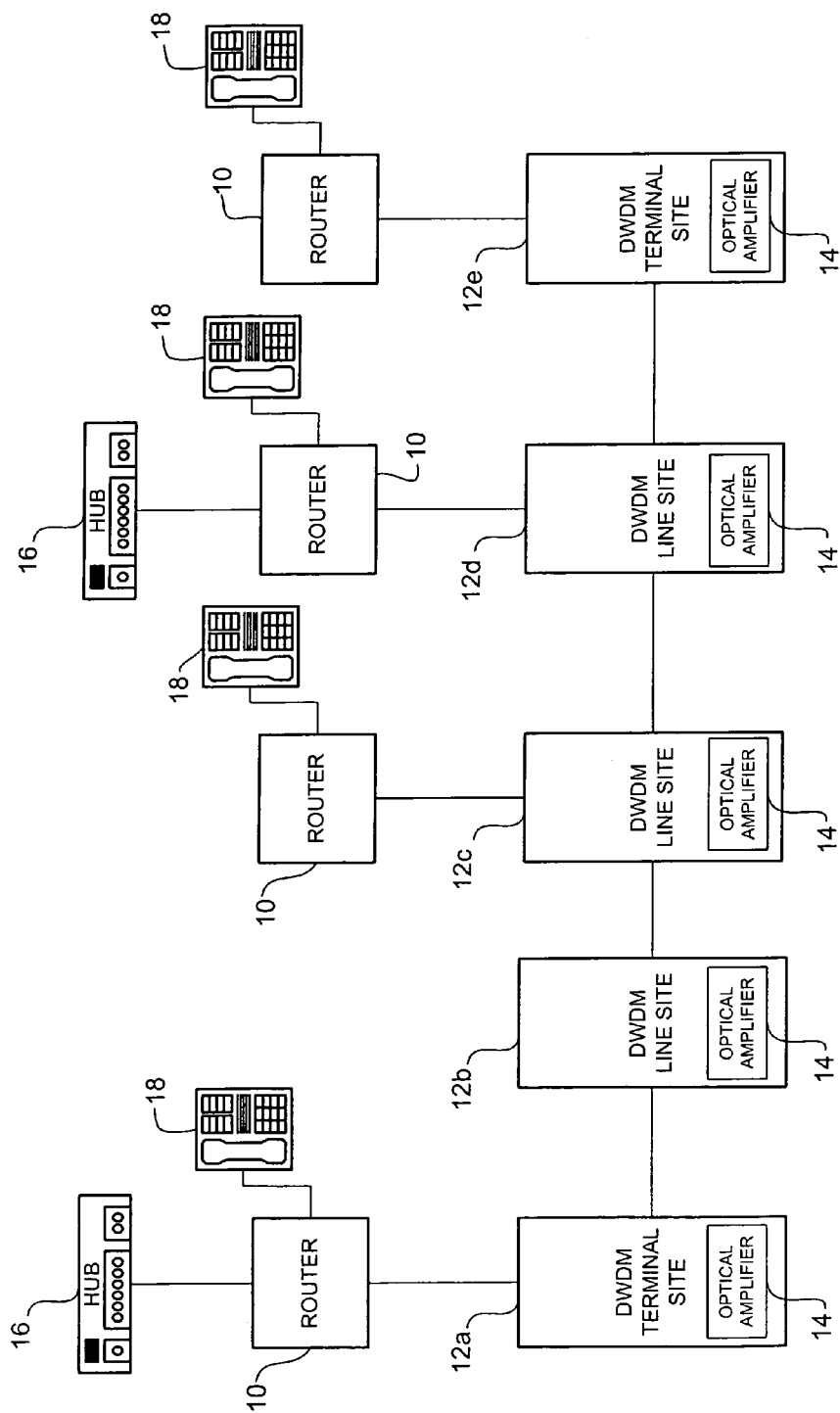
FIG. 1 is a diagram of a DWDM system configured to provide data and voice communications at remote line sites.

Referring now to the drawings, and first to FIG. 1, a system of the present invention comprises a network of IP telephony supporting routers 10 which are connected together in a DWDM network. The system allows both voice over IP (VoIP) and data communications between remote and isolated line sites (nodes) 12a, 12b, 12c, 12d, 12e within the DWDM system. The line sites 12a-12e include optical amplifiers 14 and other equipment described below. The system allows for IP or analog telephone connections to be placed at remote isolated line sites without the need for the installation of public telephone lines at each site. The system further allows for the transmittal of TCP/IP data traffic for monitoring of isolated network equipment.

The present invention operates in the context of a data communication network including multiple network elements. A network element may be, for example, a terminal multiplexer, an add-drop multiplexer (ADM), an optical crossconnect (OXC), optical transmitter, optical receiver, optical filter, optical amplifier, or a signal regenerator. Two terminal multiplexers may be linked by fiber optics with or without a regenerator to form an optical path. A Line Extender Module (LEM) may be used to regenerate the optical signal when the signal level in the fiber becomes too low due to a long distance between multiplexers. An ADM may be deployed at a location between two terminals for consolidating traffic from widely separated locations. At the site of an ADM, only those signals that need to be accessed are dropped or inserted. The remaining traffic continues through the network element without requiring special pass through units or other signal processing. A transmit hub within the system may accept various electrical payloads, such as frame relay, asynchronous transfer mode (ATM), and high-speed Ethernet. Each traffic type (channel) is sent to its corresponding physical interface, where a wavelength is assigned and modulated at an electrical-to-optical converter. The optically modulated signals from each source are then optically multiplexed and launched into the fiber. A receive hub receives a DWDM signal, optically demultiplexes it to its component wavelengths (channels) and converts each optical modulated signal to a digital electrical signal. Each digital signal is then routed to its corresponding electrical interface.

Referring again to FIG. 1, the DWDM system includes two terminal sites (e.g., east and west sites) 12a, 12e and a plurality of remote line sites 12b, 12c, 12d. The DWDM sites 12 may operate on an ONS 15800 Dense Wave Division Multiplexing Platform, available from Cisco Systems Inc. of San Jose, Calif., for example. The system shown in FIG. 1 has a point-to-point topology, however, other network topologies may also be used, such as point-to-point with add-drop capability, ring, mesh, and star. The line sites 12a, 12b, 12c, 12d, 12e are positioned at locations where optical amplification is required. The location of the optical amplifiers 14 may be estimated from the distance between transmitter and receiver and according to system design parameters, such as number of wavelengths (channels), channel width, channel separation, modulation technique, bit rate, fiber type, and other optical component characteristics, as is well known by those skilled in the art. The optical amplifiers 14 may be erbium-doped fiber amplifiers (EDFA), for example. The optical amplifiers 14 simultaneously amplify all wavelengths so that there is no need to demultiplex channels prior to amplification. There is, therefore, no need for demultiplexers at line sites 12b, 12c, 12d and payload channels carrying data through the system are not separated at these line site locations.

Figure 2:
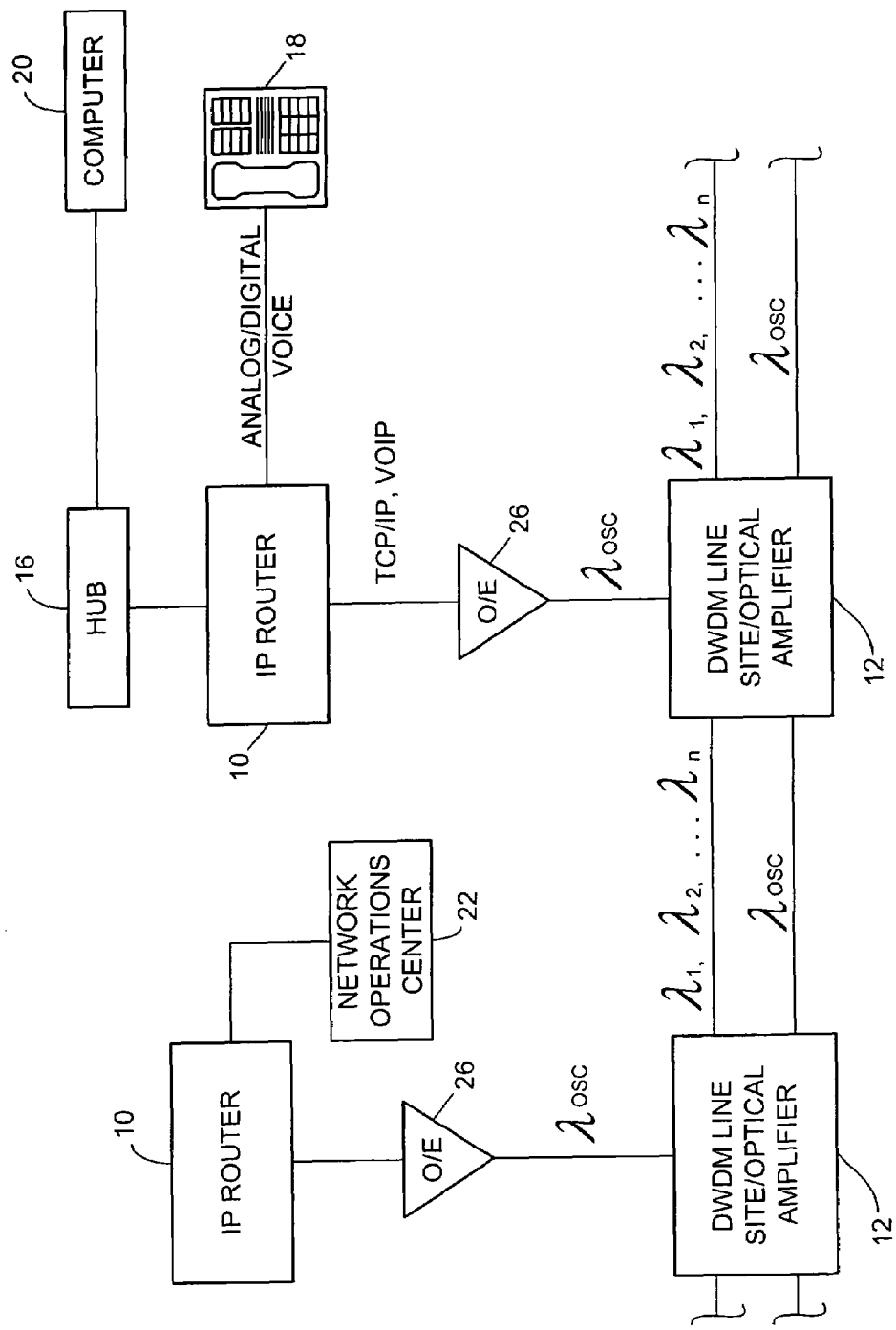
FIG. 2 is a diagram illustrating additional detail of components located at one of the remote line sites.

Each channel in the DWDM system is carried over a specified wavelength ($\lambda$) also known as an optical channel. Different channels may carry different data (e.g., voice, data, video, data packets) at different rates. The channels are combined to form one or more multiplexed payload channels. FIG. 2 shows one payload channel carrying multiplexed optical channels $\lambda_1, \lambda_2, \lambda_n$. The system may carry, for example, from one to 128 channels. The wavelengths may be distinguished by different colors. For example, the spectral area may be split into three distinct bands (blue, red, and infrared) which are separately managed. In one example, the blue band includes 8 channels at 100 GHz and 16 channels at 50 GHz, the red band includes 24 channels at 100 GHz and 48 channels at 50 GHz, and the infrared band includes 32 channels at 100 GHz and 64 channels at 50 GHz. The blue band generally covers wavelengths between 1529.55 nm and 1535.04 nm, and the red band generally covers wavelengths between 1542.14 nm and 1560.61 nm. These wavelengths fall within a payload band which carries data between end points in the network.

A separate channel, which may be referred to as a F1 user channel (or supervisory channel), operates in a wavelength riding in the fiber between DWDM sites, outside of the payload band. The F1 user channel is a portion of an optical service channel (OSC) ($\lambda_{OSC}$ of FIG. 2). The F1 user channel may be, for example, a 1 by 64K bit per second piece of the optical service channel. The primary function of the optical service channel is to provide an internal resource to carry provisioning and monitoring data for the DWDM equipment. The optical service channel provides a medium through which system parameters may be transmitted to an element management system. The optical service channel is independent of the working channels (payload band) of the DWDM system and provides a communication path that allows the owner of the network to remotely monitor and control system performance. The channel may be at a wavelength of between about 1310 nm and 1500 nm, and preferably at a wavelength of about 1480 nm, for example, or any wavelength that is out of band with respect to the payload channel wavelength bands.

A connection point to this channel is provided at each node in the DWDM span, since the channel needs to communicate with each node to transmit provisioning and monitoring data. The F1 user channel thus begins and ends at all of the sites of each span. Two or more spans may be bridged together at back to back terminal sites to allow the F1 portion of the OSC to be extended if desired. Since the optical service channel is available at each line site, each node in the DWDM line is a possible access point where router 10 and hub 16 or telephone 18 can be connected. As shown in FIG. 1, both voice and data access is provided at line sites 12a and 12d. In this example, there is no access provisioned at line site 12b and only voice access is provided at line sites 12c and 12e, but full access is available to all sites if proper equipment is installed. It is to be understood that the arrangement shown in FIG. 1 is only one example of providing voice and data communications at remote line sites and many other arrangements may be used without departing from the scope of the invention. It is also to be understood that the router 10, hub 16, and telephone 18 may be located directly adjacent to the optical amplifier 14 or located a distance from the optical amplifier while still being considered located at the DWDM line site.

As shown in FIG. 2, the optical service channel is sent to an optical-to-electrical converter (O/E) 26 where the optical signals are converted to digital electrical signals. These electrical signals are sent to router 10 and to telephone 18 for voice communications or hub 16 and computer 20 for data communications. The router 10 and O/E converter 26 are configured and connected to allow data to be communicated from one router to another router connected at the next node. Data is also sent from telephone 18 and computer 20 back through router 10 and an electrical-to-optical converter (not shown) to convert the electrical signals to optical signals before returning the data to the optical service channel $\lambda_{OSC}$.

The telephone 18 may be an IP telephone or an analog telephone (if the router 10 is properly configured as described below). The telephones 18 connected to the network may be configured as an isolated telephone network or they can be tied to an existing PBX (private branch exchange).

The F1 line is preferably available full time and may also be used to carry equipment monitoring data or other types of data to reduce the number of leased lines required for data transport. The F1 user channel is capable of carrying TCP/IP data traffic. The hubs 16 allow for transmittal of TCP/IP data for monitoring of otherwise isolated network monitoring equipment. Computer systems, such as described below with respect to FIG. 3, may be connected to the hubs 16. For example, a service technician with a laptop computer and network card can establish a network connection to a network operations center 22 or with another technician working at another site (FIG. 2). The technician can share audio, chat, data, white board drawings, or video information with technicians at other line site locations or the network operations center 22.

Figure 3:
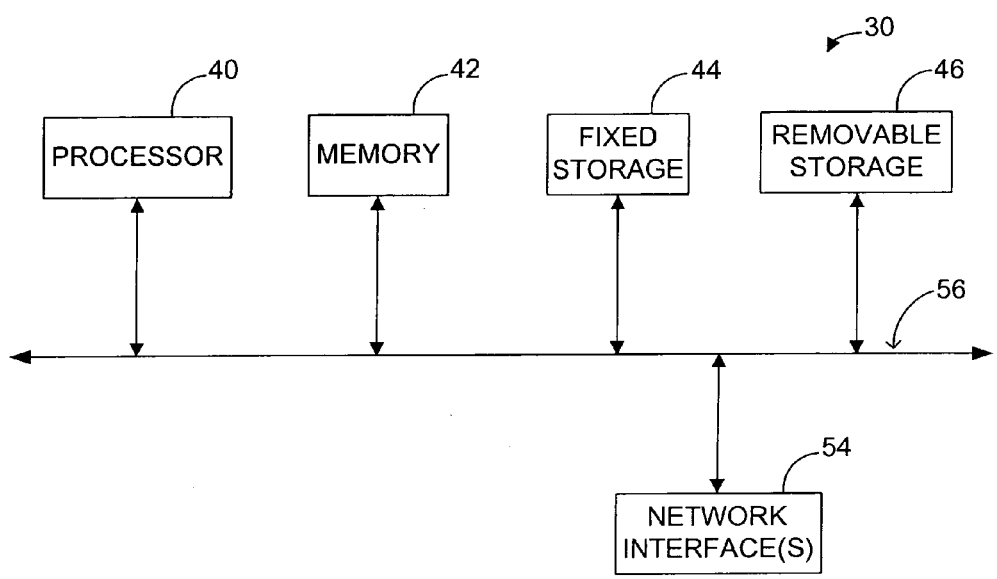
FIG. 3 is a system block diagram of a computer system that can be utilized to execute software of an embodiment of the present invention.

FIG. 3 shows a system block diagram of computer system 30 that may be used to execute software of an embodiment of the invention. The computer system 30 includes memory 42 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 30 further includes subsystems such as a central processor 40, fixed storage 44 (e.g., hard drive), removable storage 46 (e.g., CD-ROM drive), and one or more network interfaces 54. Other computer systems suitable for use with the invention may include additional or fewer subsystems. For example, computer system 30 may include more than one processor 40 (i.e., a multi-processor system) or a cache memory. The computer system 30 may also include a display, keyboard, and mouse (not shown) for use as a host.

The system bus architecture of computer system 30 is represented by arrows 56 in FIG. 3. However, these arrows are only illustrative of one possible interconnection scheme serving to link the subsystems. For example, a local bus may be utilized to connect the central processor 40 to the system memory 42. Computer system 30 shown in FIG. 3 is only one example of a computer system suitable for use with the invention. Other computer architectures having different configurations of subsystems may also be utilized. Communication between computers within the network is made possible with the use of communication protocols, which govern how computers exchange information over a network.

The router 10 is preferably configured to support IP telephony and may be a 1750, 2600 series, or 3600 series router, available from Cisco Systems Inc., for example. The router 10 may be configured with a voice interface card module which allows connection of analog telephones 18 directly to the router. With the router 10 properly configured it can operate as a TCP/IP WAN without the need for leased lines between the connection points. The bandwidth may be limited to 64Kb/s, for example, since monitoring and provisioning data typically does not consume a large amount of bandwidth. Each router 10 at a line site preferably includes two connections, one facing east and one facing west to complete the network. End point terminals 12a and 12e need only one of the connections along with a connection to transport data back to the network operations center 22. Terminals that sit back to back may use a pair of cables to bridge one line to the next. A general architecture for the router 10 will appear from the description given below. In an alternative embodiment, a router or switch may be implemented on a general purpose network host machine such as the computer system of FIG. 3.

The router 10 may include a master central processing unit (CPU) 61, interfaces 68, and a bus 65 (e.g., a PCI bus), as shown in FIG. 4. CPU 61 includes a memory 62 and a processor 63. When acting under the control of appropriate software or firmware, CPU 61 is responsible for such router tasks as routing table computations, network management, and general processing of packets. It preferably accomplishes all of these functions under the control of software including an operating system and any appropriate applications software. CPU 61 may include one or more processors 63 such as a processor from the Motorola family or microprocessors of the MIPS family of microprocessors. In an alternative embodiment, processor 63 is specially designed hardware for controlling the operations of router 10. Memory 62 can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 61 to efficiently perform routing computations, network diagnostics, security functions, etc. Router 10 may further include a packet memory 72 for intermediate storage of packets forwarded by the router.

Although the system shown in FIG. 4 is one specific router usable in connection with the present invention, it is by no means the only architecture on which the present invention can be implemented. For example, an architecture having a single processor that handles communications as well as routing computations is often used. Further, other types of interfaces and media may also be used with the router.

Regardless of a network device's configuration, it may employ one or more memories or memory modules (including memory 62) configured to store program instructions for the network management operations described herein. The program instructions may control the operation of an operating system or one or more applications, for example. The program instructions and operating system may be stored on any of the media discussed in connection with the computer system of FIG. 3, for example.

As can be observed from the foregoing, the system and method of the present invention allow for VoIP and data communications to, from, and between remote line amplifier sites. The telephone connectivity allows for voice communications at remote line sites without the extra cost of maintaining a full time leased voice or data line. The VoIP and data are sent over the optical network separate from the payload band, thus there is no increase in payload and they do not interfere with payload traffic. Furthermore, there is no need for additional equipment to separate a data channel from the payload channel at a remote line site. The data sharing capability provided by the system, along with simultaneous telephone access, allows service teams to leverage knowledge and skill sets among teammates and from the network operations center at the remote location sites.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for providing voice communications at an optical amplifier site of a DWDM system, the method comprising:
   receiving an optical service channel and a multiplexed payload channel at the amplifier site, the optical service channel carrying voice over IP data in a supervisory channel of the optical service channel and having a wavelength that is out of band with respect to wavelength bands of a multiplexed payload channel of the DWDM system, the optical service channel independent of the multiplexed payload channel and configured to carry monitoring data for DWDM equipment;
   converting an optical signal of the optical service channel to a digital electrical signal at the amplifier site; and
   sending the digital electrical signal to a router configured to support voice over IP;
   wherein the router is configured to communicate with other routers connected to other optical amplifier sites to operate in a wide area network.

2. The method of claim 1 wherein receiving an optical service channel comprises receiving an optical service channel at a wavelength of approximately 1480 nm.

3. The method of claim 1 wherein the optical service channel further carries TCP/IP data traffic.

4. The method of claim 1 wherein the router comprises a voice module operable to provide analog telephone service.

5. The method of claim 1 further comprising converting a digital electrical signal received from the router to an optical signal and sending the optical signal over the optical service channel.

6. The method of claim 5 wherein sending the optical signal comprises sending the optical signal to an adjacent amplifier site.

7. The method of claim 5 wherein sending the optical signal comprises sending the optical signal to a terminal node.

8. The method of claim 1 further comprising sending data to a network operations center.

9. The method of claim 1 wherein said network management information includes provisioning data for DWDM equipment located within the DWDM system.

10. The method of claim 1 wherein the voice data is sent over a 64K bit/second portion of the optical service channel.

11. The method of claim 1 wherein receiving the optical service channel comprises receiving voice over IP and TCP/IP data traffic over the optical service channel.

12. The method of claim 11 wherein the voice over IP and TCP/IP data traffic is carried on a F1 user channel portion of the optical service channel.

13. A system for providing voice communications at a line site location of a DWDM system, the system comprising:
   a node at the line site location operable to receive and send multiplexed optical signals of a payload channel and an optical service channel carrying voice over IP data in a supervisory channel of the optical service channel and having a wavelength that is out of band with respect to wavelength bands of the multiplexed payload channel, the optical service channel independent of the multiplexed payload channel and configured to carry monitoring data for DWDM equipment;

a converter system operable to convert optical signals received from the optical service channel at the node to digital electrical signals; and convert electrical signals to optical signals; and a router operable to receive the digital electrical signals and support voice over IP; and configured to communicate with other routers connected to other optical amplifier sites to operate in a wide area network.

14. The system of claim 13 further comprising a telephone in communication with the router.

15. The system of claim 14 wherein the router includes a voice module operable to convert the digital electrical signals to analog voice signals and wherein the telephone is an analog phone.

16. The system of claim 14 wherein the telephone is an IP telephone.

17. The system of claim 13 further comprising a hub operable to provide data communications between a computer and the router.

18. The system of claim 17 wherein the system is configured to provide TCP/IP data communications.

19. The system of claim 13 wherein the optical service channel is configured to carry TCP/IP data.

20. The system of claim 13 wherein the node comprises an optical amplifier.

21. The system of claim 13 wherein the node is not operable to demultiplex payload channels.

22. The system of claim 13 wherein the router is configured to operate as a TCP/IP wide area network.

23. A system for providing voice communications at an optical amplifier site of a DWDM system, the system comprising:

means for receiving an optical service channel at the amplifier site, the optical service channel carrying voice over IP data in a supervisory channel of the optical service channel and operating at a wavelength that is out of band with respect to wavelength bands of a multiplexed payload channel of the DWDM system, the optical service channel independent of the multiplexed payload channel and configured to carry network management information;

a converter operable to convert an optical signal of the optical service channel to a digital electrical signal; and convert an electrical signal received from the router to an optical signal for transmittal over the optical service channel; and means for sending the digital electrical signal to a router operable to support voice over IP;

wherein the router is configured to communicate with other routers connected to other optical amplifier sites to operate in a wide area network.

* * * * *